United States Patent [19]
Westphal et al.

[11] Patent Number: 4,727,346
[45] Date of Patent: Feb. 23, 1988

[54] SUPERCONDUCTOR AND NORMALLY CONDUCTIVE SPACED PARALLEL CONNECTED WINDINGS

[75] Inventors: Michael Westphal, Offenbach; Wolfgang H. Müller, Karlsruhe, both of Fed. Rep. of Germany

[73] Assignee: Bruker Analytische MeBtechnik GmbH, Silberstreifen, Fed. Rep. of Germany

[21] Appl. No.: 905,681

[22] Filed: Sep. 9, 1986

[30] Foreign Application Priority Data

Sep. 11, 1985 [DE] Fed. Rep. of Germany ....... 3532396

[51] Int. Cl.$^4$ .............................................. H01F 7/22
[52] U.S. Cl. ....................................... 335/216; 361/19
[58] Field of Search ................... 335/216, 299; 361/19, 361/141

[56] References Cited

U.S. PATENT DOCUMENTS

| | | | |
|---|---|---|---|
| 3,177,408 | 4/1965 | Mills et al. | 317/123 |
| 3,187,235 | 6/1965 | Beruncourt et al. | 335/216 |
| 3,466,504 | 9/1969 | Hart | 361/19 |
| 3,611,078 | 10/1971 | Massar et al. | 361/19 |
| 3,703,664 | 11/1972 | Cronin | 361/19 |
| 4,336,561 | 6/1982 | Murphy | 361/19 |
| 4,559,576 | 12/1985 | Ries | 361/19 |

FOREIGN PATENT DOCUMENTS

| | | | |
|---|---|---|---|
| 0115797 | 1/1984 | European Pat. Off. | |
| 1764369 | 5/1968 | Fed. Rep. of Germany | |
| 2301152 | 1/1973 | Fed. Rep. of Germany | 335/216 |
| 1230579 | 5/1971 | United Kingdom | 361/19 |
| 1463292 | 2/1977 | United Kingdom | 335/216 |

OTHER PUBLICATIONS

Article entitled "Superconducting Coil Degradation", published in the Journal of Applied Physics, (1965) by B. Taquet, p. 3251.
Article from "Report on Progress in Physics", Part II, by P. F. Chester, (1967), pp. 600–606.
Article entitled "Design and Development of the US--TESPE Toridal Coil", published in the Proceedings of the Seventh International Cryogenic Engineering Conference, (1978); IPC Science and Technology Press, by Mitchell O. Hoenig, pp. 156–172.
Cryogenics, Dec. 1976, pp. 705 to 708, Mulhall et al, "Protection of Superconducting Coils by Means of a Secondary Winding".
"Superconductor Materials Science: Metallurgy, Fabrication and Applications", (Ed.: Foner/Schwartz) Plenum Press, New York (1981) p. 194.
The Review of Scientific Instruments, vol. 34, No. 4, Apr. 1963, pp. 368 et seq., P. F. Smith, "Protection of Superconducting Coils".
Textbook by M. N. Wilson, "Superconducting Magnets", Oxford 1983, pp. 228 and 229.
IEEE Transactions on Magnetics, vol. 13, No. 1, Jan., 1977, pp. 77 et seq., P. H. Eberhard et al, "Tests on Large Diameter Superconducting Solenoids . . . ".
Leaflet entitled "3S-LMI", from Messrs. La Metalli Industriale.

*Primary Examiner*—George Harris
*Attorney, Agent, or Firm*—Pretty, Schroeder, Brueggemann & Clark

[57] ABSTRACT

A magnet coil (30) comprises at least one first winding made of wire (34) which is superconductive at operating temperature and at least one second winding made of normally conductive wire (36). In addition, means are provided for supplying a current into the second winding, which is completely dead during superconductive operation of the magnet coil (30), when at least certain sections of the superconductive wire (34) assume the normally conductive state.

In order to accelerate the spatial propagation of this transition in the magnet coil (30) and at the same time to provide the possibility to use low-cost wires having a relatively small proportion, related to the cross-sectional area, of normally conductive material, the first and the second winding are connected in parallel electrically.

12 Claims, 5 Drawing Figures

SUPERCONDUCTOR AND NORMALLY CONDUCTIVE SPACED PARALLEL CONNECTED WINDINGS

The present invention relates to a magnet coil having at least one first winding made of wire which is superconductive at operating temperature and at least one second winding made of normally conductive wire, the said first winding and the said second winding being electrically connected in parallel so that a current is supplied into the second winding, which is completely dead during superconductive operation of the magnet coil, when at least certain sections of the superconductive wire assume the normally conductive state.

A magnet coil of this type has been known from U.S. Publication CRYOGENICS, 1976, pages 705 to 708.

For generating magnetic fields of high field strength, it has been known in the art to use magnet coils which are wound from superconductive wire and which are cooled down in operation to a temperature at which the wire assumes a superconductive state. Accordingly, these coils are provided in a cryostat which is cooled in the area of the magnet coil by means of liquid helium to maintain a temperature in the range of only a few K. One initially feeds into the magnet coil a relatively high current by means of an external power supply unit, and short-circuits the coil superconductively later, when the desired field strength has been reached, by raising the current by means of a so-called superconduction switch.

The energies stored in larger superconductive magnet coils are frequently in the MJ range. In the present context, the term "larger superconductive magnet coils" is used to describe coils having an inner diameter of, for example, over 30 cm.

However, the very high magnetic field strength leads not only to a very high energy content in the magnetic coil, but also to considerable mechanical tensile stresses which are encountered in the wire forming the winding due to Lorentz forces. In designing and sizing such magnet coils one, therefore, has to take care that the tensile stresses encountered will not overstrain the magnet coil mechanically.

Such overstraining may lead to a so-called "quench", i.e. an irreversible transition from the superconductive to the normally conductive state. When such a quench occurs, at least a portion of the wire forming the winding becomes normally conductive and presents an ohmic resistance which is passed by the nominal current of the coil so that the whole energy content of the magnet coil is converted to thermal energy in next to no time.

It therefore has to be avoided that in the event of a quench the normally conductive zone remains limited for an extended period of time to only one partial area of the magnet winding because otherwise the described conversion of energy would cause inadmissible heating at this point and, thus, lead to the destruction of the coil. In addition, the very high nominal current which flows through the ohmic resistance of the normally conductive wire section with, due to the temperature, reduced electric conductivity, gives rise to overvoltages which lead to disruptive discharges and, consequently, to damage to the electric insulation.

In the case of the known magnet coils, the mechanical tensile stresses occurring in the wire of the winding, which follow the relation $$\sigma = jBr$$

(wherein $\sigma$=the mean tensile stress in the wire cross-section; $j$=the mean current density in the wire cross-section; $B$=the axial component of the magnetic induction in a winding; $r$=the radius of a winding) are limited by a reduced electric current density $j$. In addition, one normally uses a superconductive wire in which the proportion of the superconductive material, which is provided in the form of multifilaments in a normally conductive carrier material, usually copper, makes up less than 20%, related to the cross-sectional area. Although this leads to a correspondingly lower critical current-carrying capacity, it also leads to extremely high electric and thermal conductivity at low temperature, due to the relatively high proportion of the normally conductive carrier material, related to the cross-sectional area.

The normally conductive metal serves in this case on the one hand as a mechanical reinforcement. In addition, when a partial quench occurs, the temperature rise is delayed in this area because of the relatively low thermal power. Furthermore, a certain improvement is obtained regarding the propagation of the normally conductive zone, by the high thermal conductivity of the normally conductive metal. This finally has the effect to provide a certain dynamic stabilization against flow surges and a certain cryostatic stabilization in the case of magnet windings which are permeable to liquid helium.

One always tries in these cases to ensure that in the case of a local quench the heat encountered locally is distributed with sufficient rapidity so that the largest possible area, if possible the entire magnet coil, assumes the normally conductive condition and, accordingly, the stored energy is converted to thermal energy in the largest possible area, in order to prevent overheating and overstressing and, thus, damage or destruction. The wire costs are a very important economic factor in this connection.

The before-mentioned U.S. Publication CRYOGENICS; 1976, pages 705–708, describes a protective circuit for a superconductive coil which makes use of a secondary winding. The secondary winding consists of copper wire, is wound as a bifilar winding together with the primary winding consisting of a superconductive wire, and the two windings are interconnected by their ends. Now, when a transition from the superconductive state to the normally conductive state occurs at any point of the superconductive winding, the current is coupled from the superconductive winding, which alone is current-carrying during superconductive operation of the magnet coil, into the copper wire winding. This means that the secondary winding consisting of copper wire will heat up uniformly over its whole length, and this has the effect that the superconductive coil, too, assumes the normally conductive state over its full length so that the thermal energy released during the quench is distributed over the largest possible volume.

This property of the known coil, which at the first glance seems to be an advantage, turns out to be a disadvantage when considered more carefully because the fact that the secondary coil consisting of copper wire is heated up over its full length leads to the condition that—measured by the criteria interesting here—a long period of time passes until the primary coil wound from superconductive wire is reached by the heating effect.

This may, under certain circumstances, lead to the condition that so much heat has been released in the meantime at the point of the local transition from the normally conductive to the superconductive state that the superconductive wire has already molten or been damaged at this point.

From German Disclosure Document No. 17 64 369 another protective circuit for a superconductive magnet coil has been known in which the coil wound from superconductive wire is tapped at several points and the coil sections arranged in series thus created are shunted by ohmic resistors which are likewise connected in series. The ohmic resistors are arranged outside the magnet coil as discrete components.

This arrangement of the known protective circuit is to ensure that when a local transition from the superconductive to the normally conductive state occurs in a section of the superconductive coil, the current is coupled at that point into the ohmic resistor connected in parallel so that a voltage drop occurs over the whole respective section of the superconductive coil. As the individual sections of the superconductive coil, which are connected in series, are closely cross-coupled with each other an additional current is induced in this manner in all other sections of the superconductive coil, due to the existing mutual inductance. On condition that the magnet coil is operated closely below that critical current intensity up to which superconductive operation is possible, the mechanism described before may effect that a given current threshold is just exceeded as a result of the additional induced current, so that the whole coil assumes the superconductive state.

It is a disadvantage of this known protective circuit that the coil must be operated as closely as possible below the critical current intensity - a condition which normally is not desirable for safety reasons. In addition, the number of coil sections must be selected as small as possible to obtain the greatest possible length for the sections and/or number of windings if the described induction process is to be kept within feasible orders of magnitude. Finally, the value of the ohmic resistance also must be as high as possible to achieve the highest possible voltage drop across the coil sections. However, this leads in turn to considerable time constants and, thus, to the disadvantages described above.

Another measure to accelerate the propagation of the quench has been proposed by EP Disclosure Document No. 115 797. In this case, it has been suggested to provide the magnet winding with heating windings, which upon commencement of a quench are supplied with current either from an external current source or by the voltage dropping across a passive detector network when a quench occurs, but this only so long as the quench has not yet propagated over the complete magnet winding.

A device for improving the protection of the coil in the case of a quench that has been proposed by U.S. Publication Rev. Sci. Instruments, 34 (1963), pages 368 et seq., provides that the magnet winding is subdivided into partial windings and that the latter are shunted by ohmic resistors into which part of the current flowing through the partial windings concerned is coupled when the quench has not yet propagated fully. However, it is a disadvantage of this method that frequently very high electric powers are encountered in these resistors which may even lead to their destruction. In addition, the desired acceleration of the propagation of the quench is reached by this measure only to a very limited degree.

The textbook by M. N. Wilson, Superconducting Magnets, Oxford 1983, pages 228 and 229, proposes to bring the ohmic resistors in close heat-conductive contact with the magnet winding so as to use them as heaters for accelerating the propagation of the quench. However, it is a disadvantage of this proposal that generally heat is also generated in these resistors during charging and discharging of the magnet, and this heat may also initiate a quench. According to the same publication, the propagation of the quench may also be accelerated by electric heaters which are heated up by an external current source as soon as the beginning of the quench has been detected by a detector circuit. This solution has, however, the drawback that the reliability of the protection of the coil is limited by the active elements.

Another device proposed by U.S. Publication IEEE Trans. Magn. 13 (1977), pages 77 et seq., provides to bring the magnet winding in close heat-conductive contact with an inductively coupled secondary winding wound from a normally conductive material. This secondary winding may be constituted by the coil body. As soon as the magnet field decays with sufficient rapidity—when initially the quench has propagated only partially—eddy currents are induced in the secondary winding and heat the latter up so that, consequently, the superconductive magnet winding is heated over larger areas and the propagation of the quench is accelerated. Although, in principle, an acceleration of the propagation of the quench is actually achieved in this case, it is obvious that effective acceleration commences only at a point of time when a relatively high electric resistance has already built up in the superconductive winding in which the quench occurs, which then causes the magnet field, and the induction of secondary currents, to die out with sufficient rapidity.

A common substantial disadvantage of the known configurations lies in the use of a superconductive wire having a large proportion of normally conductive material of, for example, 80%, related to the cross-sectional area. The production of such wires is complicated and costly but essentially independent of the respective proportions, related to the cross-sectional area, of normally conductive metal on the one hand and superconductive material on the other hand. A wire with a, comparatively, low proportion of normally conductive metal of, say, 50 to 75%, related to the cross-sectional area, which would have a considerably higher critical current-carrying capacity due to the considerably higher proportion of superconductive material, would cost only very little more so that, to look at it the other way, the wire costs of the usually employed wires having a large proportion of normally conductive material, related to the cross sectional area and, thus, a lower current-carrying capacity, are very high, measured by their current-carrying capacity. Wires of this type with a low proportion of normally conductive metal have been known from "Superconducting Materials Science: Metallurgy, Fabrication and Applications" (Ed.: Foner/Schwartz), Plenum Press, New York 1981, page 194.

It has been proposed already to reduce the wire costs by the use of so-called "ready-made" conductors where one or more wires consisted of superconductive wire with a low proportion of normally conductive metal of, say, 50 to 75%, related to the cross-sectional area, and one or more wires consisting of a normally conductive metal were firmly connected therewith mechanically, for example twisted and then soldered.

It has further become known, for example from a leaflet entitled "3S-LMI" from Messrs. La Metalli Industriale, to wrap a strap of normally conductive metal around a conductor consisting of a superconductive wire with a relatively low proportion of normally conductive metal, related to the cross-sectional area, and to close the joint of the wrapping by soldering.

However, these known "ready-made" conductors are still relatively expensive, due to the required production steps, and in addition their insulation is, in principle, less reliable than that of one-piece conductors.

From U.S. Pat. No. 3,177,408, there have also been known superconductive wires exhibiting a square cross-section.

Now, it is the object of the present invention to improve a magnet coil of the type described at the outset to ensure safer operation and a further improved protection of the coil winding in the event of a quench, by rapid spatial propagation of the normally conductive state, while permitting the use of a superconductive wire with a relatively low proportion of normally conductive metal, related to the cross-sectional area, i.e. while keeping the production costs low.

According to the invention, this object is achieved by an arrangement in which the magnet coil comprises a plurality of mutually interconnected first winding sections consisting of a superconductive wire and the said first winding sections are at least partly connected in parallel with second winding sections consisting of a normally conductive wire.

In this manner, the object of the invention is achieved perfectly and completely.

For, the parallel connection of the first winding with the second winding has the effect that when a normally conductive state occurs at any point of the formerly superconductive path of the parallel connection, the nominal current will immediately branch off by sections and flow also through the said second winding sections so that the whole spatial area of the second winding section is heated automatically, i.e. without any external detector or switching means.

It can be shown that the current coupled into the parallel normally conductive winding section rises as the resistance of the normally conductive winding section decreases. This means that in the extreme case which is still feasible practically, the coil can be wound as a bifilar winding from one superconductive and one normally conductive wire, which are electrically connected after every winding layer. In the event of a local "quench" within a superconductive winding layer, a current maximum is then coupled into the parallel normally conductive layer which causes the coil to be heated instantaneously over one full circumferential surface.

The mechanical and electric effects provoked in the case of the known superconductive wires by the relatively high proportion of normally conductive metal, usually copper, are taken over according to the invention by the second winding which, typically, consists of a copper wire so that it is possible to select for the first winding a superconductive wire with a relatively low proportion of normally conductive metal, related to the cross-sectional area. Instead of a conventional superconductive wire exhibiting a ratio of 5:1 of normally conductive to superconductive metal, it is, therefore, possible according to the invention to use a wire with a proportion of 2:1 which, therefore, provides twice the current-carrying capacity of the first-mentioned wire at comparable production costs. This clearly permits considerable cost savings to be realized.

The inventive arrangement provides the further advantage that, depending of the winding profile of the individual magnet coil, the parallel winding sections can be given different lengths so that certain coil sections, whose configuration is very critical as regards the achievable homogeneity of the coil, can be made without any interruption, i.e. without taking out any lines and without any joints, while others, in particular such for which there is a particular risk of a quench, may be designed in a correspondingly adapted manner.

According to another preferred embodiment of the invention, the windings and/or the winding sections are formed as layers.

This feature provides the considerable advantage that the second winding, when designed as a layer, influences obviously a particularly large spatial area, i.e. an entire circumferential surface.

According to another preferred embodiment of the invention, the first windings and/or winding sections are frictionally connected with the second winding and/or winding sections. When the windings and/or winding sections are designed in the form of layers this can be realized above all by giving the layers wound from the superconductive wire at least partially a smaller winding radius than the layers wound from normally conductive wire.

This feature provides the advantage that the normally conductive layers act as bandages embracing the full periphery of the layers wound from the superconductive wire so that any inadmissible expansion of the windings consisting of the superconductive wire, in particular of those having the smallest winding radius, due to tensile stresses resulting from the before-mentioned Lorentz forces, is safely prevented. Accordingly, this feature is an active precautionary effort to exclude the occurrence of quench conditions from the very beginning.

The effects just described can be achieved in particular when the layers consisting of the superconductive wire have in average a smaller winding radius that the radius of the winding consisting of the normally conductive wire. However, according to another preferred feature, the magnet coil is composed, as the winding radius increases, of alternating layers or layer packages of superconductive wire and layers or layer packages of normally conductive wire.

This arrangement provides a particularly high degree of safety that any Lorentz forces encountered will be absorbed effectively and uniformly.

According to a particularly preferred embodiment of the invention, the winding sections which are connected in parallel are arranged in the magnet coil at a spacing relative to each other.

This feature provides the very particular advantage that in the event of a locally restricted quench two different spatial areas are immediately heated up, i.e. one at the point of the superconductive path of the parallel connection where a transition into the normally conductive state has occurred, and on the other hand the whole area of the normally conductive path of the second winding spaced therefrom. In the case of a coil wound in layers, the temperature rise thus occurs simultaneously at a point of the—normally—superconductive path located radially inwardly, and in a layer located radially outwardly, which supports the quick propagation of the normally conductive state in a particularly efficient manner.

This particular advantage is achieved above all when, according to a further improvement of this embodiment of the invention, the spaced winding section consisting of the normally conductive wire is provided in effective heat-conducting contact with at least one additional winding section of superconductive wire.

In this case, the second winding consisting of normally conductive wire, which is spaced from the actual center of the quench and which is heated up immediately, will heat up directly and, thus, transfer into the normally conductive state, one or more neighboring superconductive winding sections connected with it in heat-conductive relationship, and as a result thereof the normally conductive second windings connected in parallel to the said neighboring superconductive winding sections, and provided again at a certain spacing, are also heated up. Thus, a chain reaction progressing over the whole volume of the magnet coil is obtained which leads to the practically instantaneous transition of the whole winding volume from the superconductive to the normally conductive state. Accordingly, the conversion into thermal energy of the magnetic energy stored in the superconductive magnet coil is distributed over the whole volume of the coil so that local overheating and overstraining are safely avoided.

According to still other embodiments of the invention, each winding section consisting of superconductive wire has approximately the same mutual inductance, relative to the whole winding consisting of superconductive wire, as the respective winding section of normally conductive wire connected to it in parallel.

This feature provides the advantage that any voltages induced due to field variations, for example when the magnetic field is energized or de-energized, will not result in any current transfer and, thus, not generate any heat in the normally conductive wire so that no additional risk is created that a quench process may be initiated prematurely by any such field variation. Rather, the current transfer takes place in the normally conductive wire exactly at the moment when a finite ohmic resistance is developed in any areas of the superconductive wire, i.e. when a partial or complete transition into the normally conductive state occurs. It results that the described design of the magnetic coil does not restrict the energizing or de-energizing speed of the magnet coil.

According to a further preferred feature of the invention, the superconductive wire runs parallel to the normally conductive wire in at least one layer.

According to another advantageous feature of the invention, the superconductive wire is a multifilament wire with a proportion of a normally conductive carrier material, related to the cross-sectional area, of less than 80%, preferably between 50 and 75%.

The normally conductive wire consists, preferably, of a copper wire in semihard condition having a residual resistance ratio of above 50.

Finally, another advantage is obtained according to the invention when the superconductive wire and the normally conductive wire exhibit rectangular cross-sections.

This feature permits in a simple manner to realize a particularly efficient mechanical frictional connection between the first winding and/or winding sections and the second windings and/or winding sections.

Other advantages of the invention will become apparent from the specification and the attached drawing.

It goes without saying that the features that have been described above and that will be explained below may be used not only in the described, but also in other combinations, or individually, without leaving the scope of the present invention.

Certain embodiments of the invention will be described hereafter in detail with reference to the drawing in which.

Figures 1, 2:
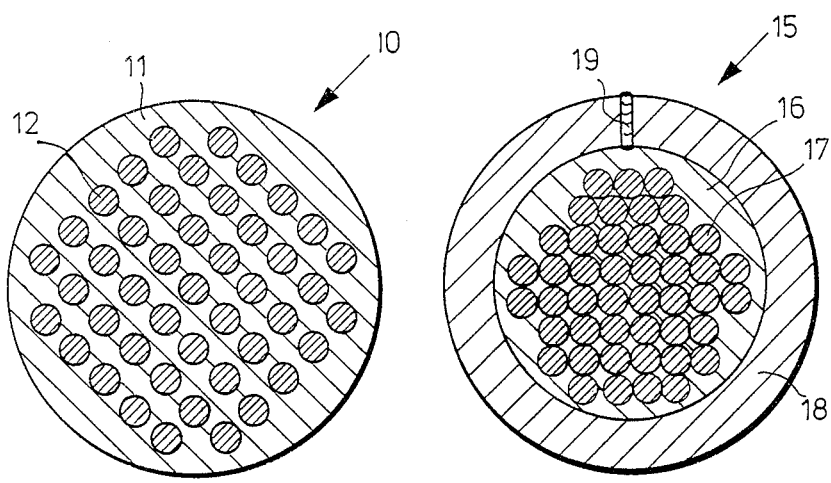
FIGS. 1 and 2 show cross-sectional representations, in enlarged scale, of superconductive wires according to the prior art.

In FIG. 1, a superconductive multifilament wire shown in cross-sectional representation is designated as a whole by reference numeral 10. A copper carrier 11, generally described as a carrier material or normally conductive metal, comprises superconductive filaments 12 which are provided therein in spatial distribution. A characteristic value of superconductive wires 10 is the ratio between the cross-sectional surface of the copper carrier 11 and that of the superconductive filaments 12. The wires used for modern large superconductive magnet coils of high homogeneity normally have a ratio of approx. 7:1.

FIG. 2 shows another superconductive multifilament wire 15 whose copper carrier 16 has a smaller cross-section, compared with the embodiment shown in FIG. 1, so that the same number of superconductive filaments 17 is packed closer in the copper carrier 16. The ratio of the cross-sectional areas, related only to the copper carrier 16, is for example 3:2 or even smaller. Yet, the outer diameter of the superconductive wire 15 as shown in FIG. 2 is the same as that of the wire 10 shown in FIG. 1 because a copper jacket 18 is wrapped around the copper carrier 16 in its circumferential direction, and closed by an axially extending soldered seam 19. In the case of the known wires, this arrangement provided the possibility to use a somewhat thinner superconductive wire which, therefore, could be produced at somewhat lower cost, however the desired relatively high proportion of normally conductive copper, related to the cross-sectional area, made it necessary to add the copper jacket 18 and to solder it at 19, which resulted in additional costs. In addition, due to the presence of the soldered seam 19, this conductor can no longer be insulated electrically by the enamelling process although the latter is economical and also advantageous technically because of its small coating thickness.

Figure 3:
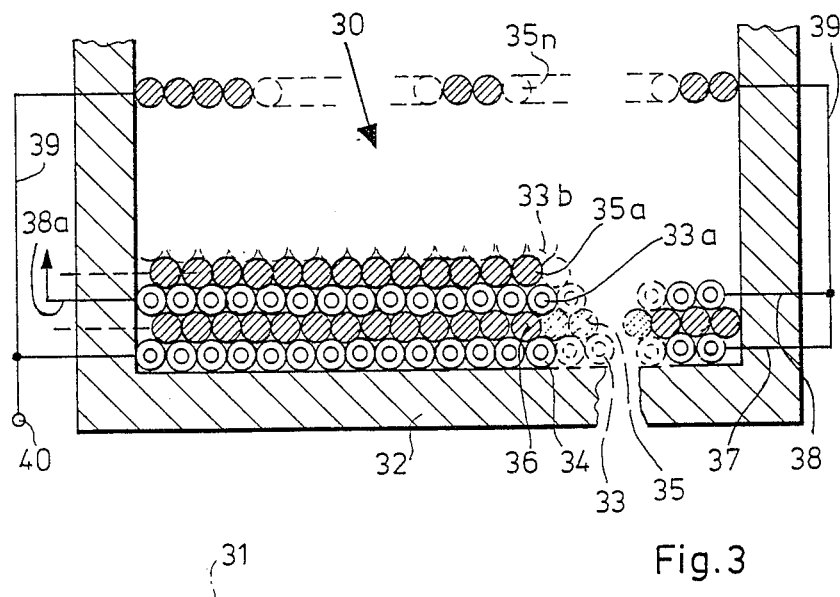
FIG. 3 shows a longitudinal section, partly broken away, through one embodiment of a magnet coil according to the invention.

The magnet coil shown in FIG. 3 as an embodiment of the invention uses, in contrast, a superconductive wire with a relatively small proportion of normally conductive material, related to the cross-sectional area, the proportion being approximately comparable with that of the "core" 16 in FIG. 2 alone.

The superconductive coil 30 shown in FIG. 3 is provided in axially symmetric arrangement about a longitudinal axis 31, while reference numeral 32 indicates a coil body. Layers 33, 33a..., 33n of a superconductive wire 34 and layers 35, 35a..., 35n of a normally conductive wire, namely copper wire, 36 are arranged one above the other in chambers of the coil body 32.

The particular arrangement of the wires 34, 36, which exhibit circular cross-sections, shown in FIG. 3 is meant only as an example. It goes without saying that other conventional winding techniques may be used as well and that wires having a cross-sectional shape different from the circular shape, for example a rectangular cross-section, may also be used.

Connections of the layers 33, 33a..., 33n of superconductive wire, which are realized in the usual manner, are shown at 37, 38, 38a in FIG. 3.

However, it can be seen that the first layer 33 of superconductive wire 34 is connected in parallel by means of connections 39 with a layer 35n of copper wire 36 provided in spaced arrangement.

Finally, the beginning of the first layer 33 of superconductive wire 34 is designated by reference numeral 40.

Figure 4:
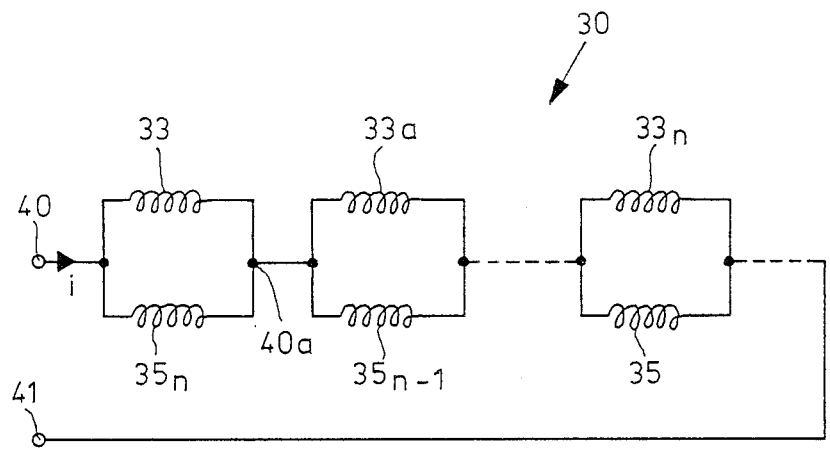
FIG. 4 shows a wiring diagram for the magnet coil shown in FIG. 3.

In addition, it is easily apparent from the wiring diagram shown in FIG. 4 that a series connection of likewise parallel winding sections $33/35n$; $33a/35n-1$..., $33n/35$ is connected between the connections 40, 41 of the superconductive coil 30.

This means that in the purely superconductive state of the magnet coil 30, the operating current i flows exclusively through the superconductive paths of the layers 33, 33a..., 33n. Only when a normally conductive area is formed within any of the layers 33, 33a..., 33n will the current i branch off as shown in FIG. 5.

Figure 5:
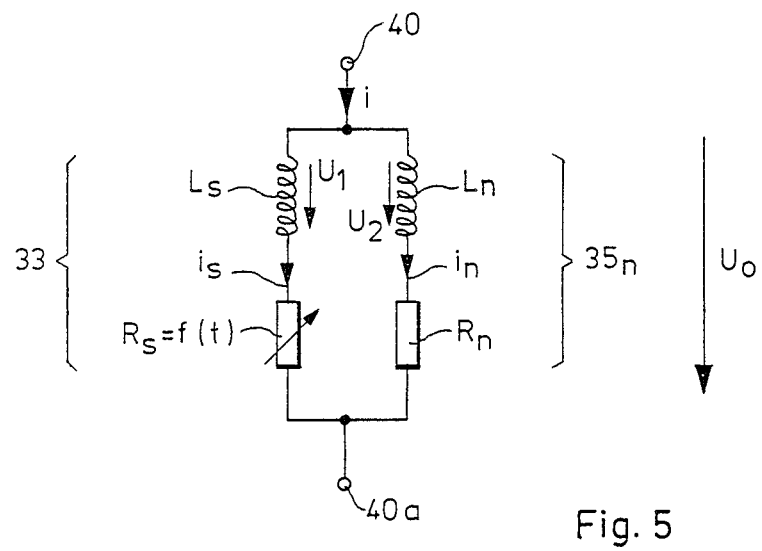
FIG. 5 shows an electric equivalent wiring diagram of two windings and/or partial windings connected in parallel according to the invention.

FIG. 5 shows the electric equivalent circuit diagram of one of the parallel connections $33/35n$. The layer 33, which is superconductive in operation, consists of the series connection of an inductor $L_s$ and a time-variant resistor $R_s$ which are passed by a "superconductive" current $i_s$. Connected in parallel thereto is the normally conductive layer 35n consisting of an inductor $L_n$ and a resistor $R_n$ which are passed by a "normally conductive" current $i_n$.

When the inductors $L_s$ and $L_n$ are equally coupled inductively with the completely superconductive magnet winding, the inductive voltage components $U_1$ and $U_2$ are equal at both inductors $L_s$, $L_n$.

One therefore obtains the following relation:

$$i_s R_s(t) = i_n R_n$$

or $$i_n = i_s(t) R_s(t)/R_n$$

regardless of the full voltage drop $U_0$, $U_1$ and $U_2$.

From this follows that the "normally conductive" current $i_n$ become zero when the ohmic resistance of the superconductive layer 33 becomes zero, too, i.e. when the layer 33 is completely superconductive. This is true regardless of the charging or discharging voltage $U_0$. However, the normally conductive layer 35n takes over part of the current exactly at the moment when the superconductive layer 33 assumes the normally conductive state, either partially or fully.

When the magnet coil 30 shown in FIG. 3 is passed by the nominal current i in the completely superconductive state, Lorentz forces occur which tend to press the superconductive layers 33, 33a..., 33n outwardly. This force acting radially outwardly is, however, counteracted by the bandages of the normally conductive layers 35, 35a..., 35n which are provided outside the superconductive layers 33, 33a..., 33n.

As can be further seen in FIG. 3 by way of example, the neighboring layers 33, 33a..., 33n; 35, 35a..., 35n are provided in close, heat-condnucting arrangement. If, for example, the normally conductive layer 35 is passed by a "normally conductive" current $i_n$ due to a quench of the superconductive layer connected with it in parallel, and consequently heated up, then this heat is transmitted directly by the normally conductive layer to the two directly adjacent superconductive layers 33 and 33a. This in turn provokes the secondary reaction that the two neighboring superconductive layers 33, 33a also assume the normally conductive state, as a result of the effective heat-conductive arrangement, so that as a tertiary reaction the normally conductive layers 35n etc. connected in parallel with the last-mentioned layers are heated up in turn. This chain reaction ensures instantaneous heating up of the magnet coil 30 and, thus, its immediate transition into the normally conductive state over a large volume.

As has been mentioned before, the magnet coil 30 shown in FIG. 3 can be wound from a superconductive wire 34 corresponding to the mere "core" 16 of the wire shown in FIG. 2. Preferably, the proportion of the normally conductive carrier 16 is less than 80% in the case of the superconductive wire 34, typically in the range of between 50 and 75%.

The normally conductive wire 36 consists preferably of a copper wire in semihard condition having a residual resistance ratio of above 50.

We claim:

1. A magnet coil having at least one first winding made of wire which is superconductive at operating temperature, said first winding being comprised of a plurality of serially connected first winding sections, and at least one second winding made of normal conductive wire, said second winding being comprised of a plurality of serially connected second winding sections, each one of said second winding sections being connected in parallel to one of said first winding sections, wherein each second winding section is arranged within the magnet coil in spaced relationship with respect to the first winding section to which it is connected, so that each second winding section of normal conductive wire is provided in effective heat-conducting contact with at least one additional first winding section of superconductive wire.

2. A magnet coil according to claim 1, wherein said first and second winding sections form layers.

3. A magnet coil according to claim 1, wherein said first winding sections are frictionally connected with said second winding sections.

4. A magnet coil according to claim 2, wherein at least part of said layers of superconductive wire have a smaller winding radius than said layers of normal conductive wire.

5. A magnet coil to claim 4, wherein said layers of superconductive wire have on average a smaller winding radius than said layers of normal conductive wire.

6. A magnet coil according to claim 1, wherein said magnet coil is composed, as its winding radius increases, of alternating packages of superconductive wire and of normal conductive wire, each package comprising at least one layer of superconductive or normal conductive wire, respectively.

7. A magnet coil according to claim 1, wherein each first winding section has approximately the same mutual inductance, relative to the whole first winding of superconductive wire, as the respective second winding section of normal conductive wire connected to it in parallel.

8. A magnet coil according to claim 2, wherein the superconductive wire runs parallel to the normal conductive wire in at least one layer.

9. A magnet according to claim 1, wherein the superconductive wire is multifilament wire with a proportion of a normal conductive carrier material, related to the cross-sectional area, of less than 80%.

10. A magnet coil according to claim 9, wherein the proportion of normally conductive carrier material, related to the cross-sectional area, is between 50% and 75%.

11. A magnet coil accoring to claim 1, wherein the normal conductive wire is a copper wire in semihard condition having a residual resistance ratio of above 50.

12. A magnet coil according to claim 1, wherein the superconductive wire and the normal conductive wire each have a rectangular cross-section.

* * * * *